A. P. COOPER & M. C. PETERS.
FEEDING MECHANISM FOR REDUCING MILLS.
APPLICATION FILED JAN. 27, 1914.
1,099,537.
Patented June 9, 1914.
3 SHEETS—SHEET 1.
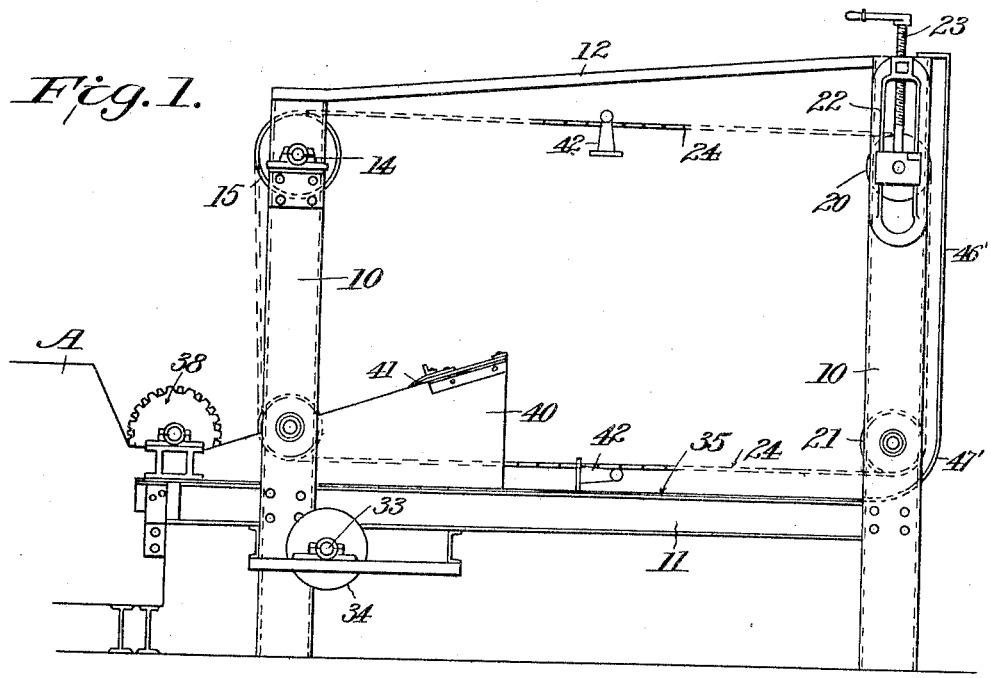
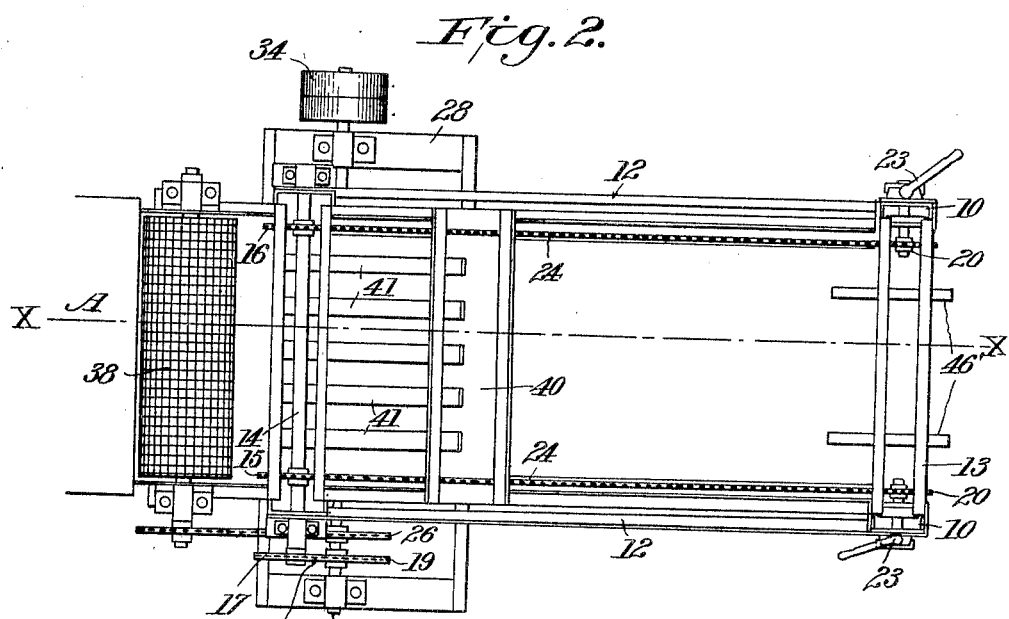

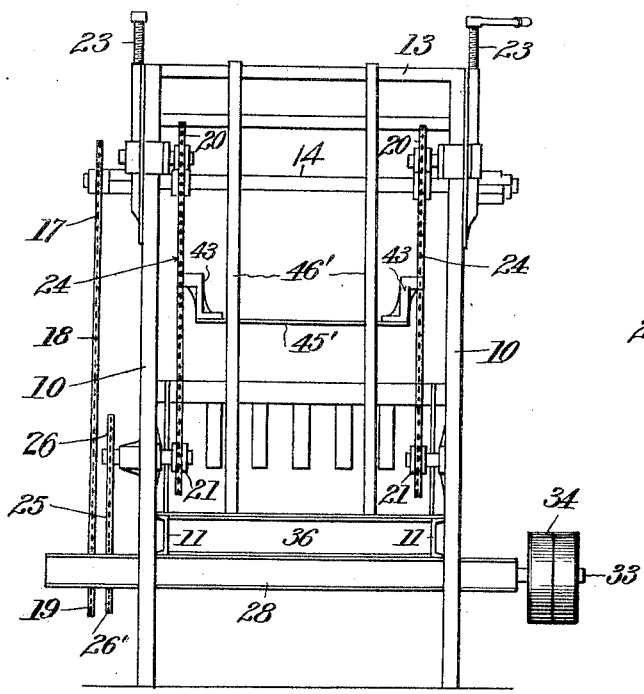
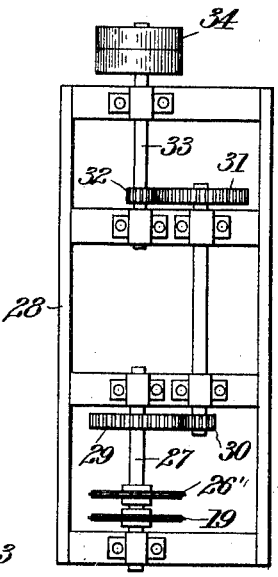
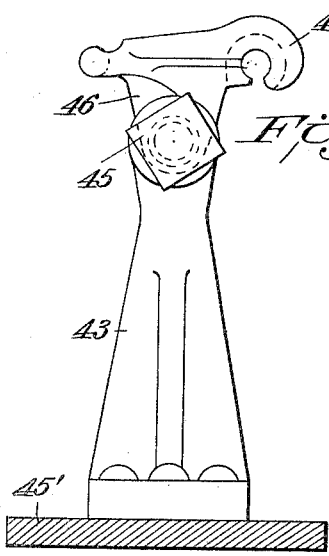

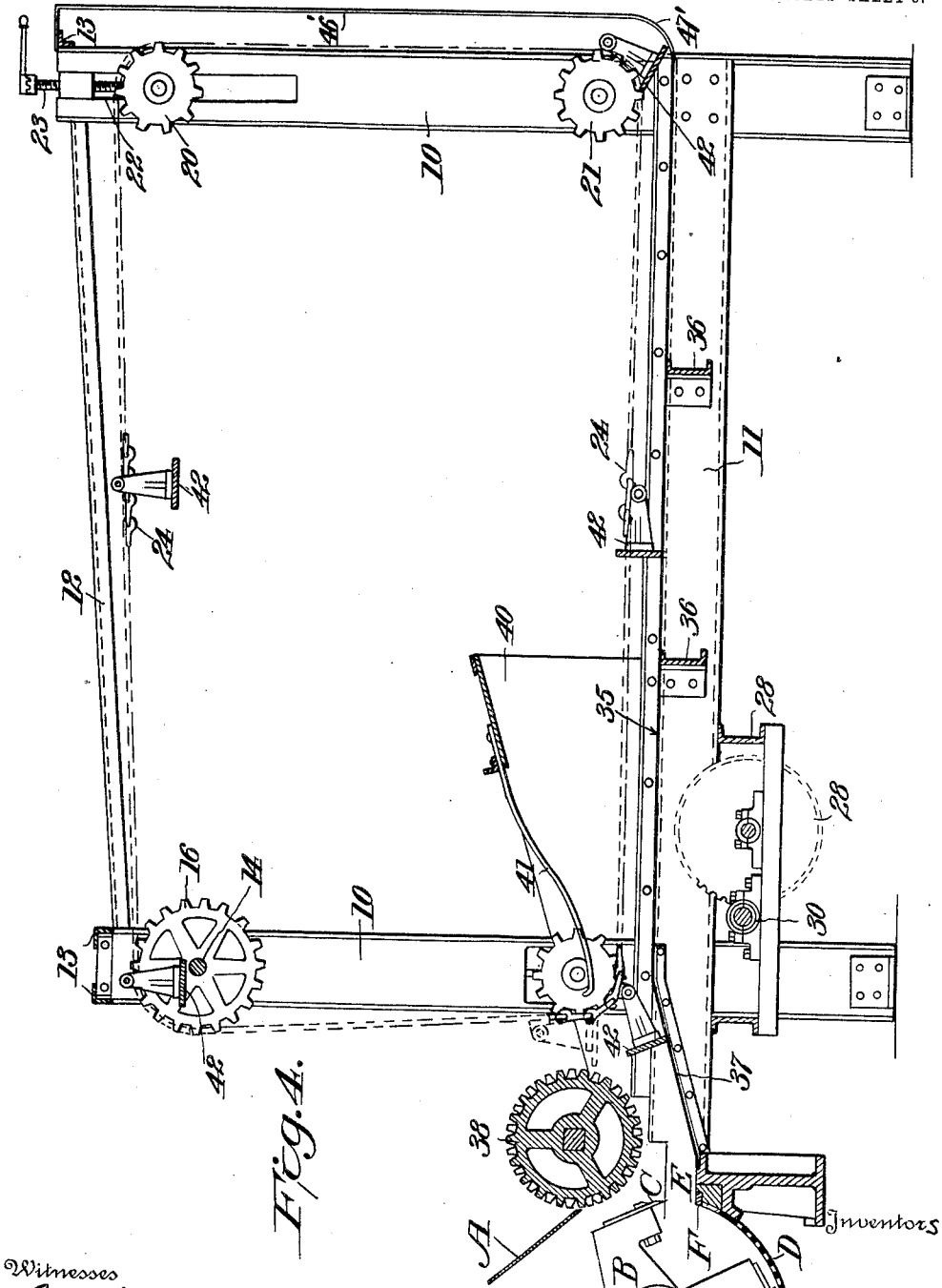

UNITED STATES PATENT OFFICE.

ARTHUR P. COOPER AND MILTON C. PETERS, OF OMAHA, NEBRASKA.

FEEDING MECHANISM FOR REDUCING-MILLS.

1,099,537.   Specification of Letters Patent.   Patented June 9, 1914.

Application filed January 27, 1914. Serial No. 814,810.

*To all whom it may concern:*

Be it known that we, ARTHUR P. COOPER and MILTON C. PETERS, citizens of the United States, residing at Omaha, in the county of Douglas and State of Nebraska, have invented certain new and useful Improvements in Feeding Mechanism for Reducing-Mills, of which the following is a specification.
Our invention relates to a feeding mechanism adapted to progressively advance to a point of delivery, charges or portions of a material of any desired character.

Primarily, our invention relates to an improved means for feeding alfalfa or other hay, clover, or like forage into the throat or inlet of a reducing machine, in which the aforesaid material is engaged by an appropriate cutting mechanism and reduced into a coarse meal or the like composed of leaves and stems and designed as a stock food, and as a food for fowls; and our invention consists of the parts, and the constructions, arrangements and combinations of parts which we will hereinafter describe and claim.

In the accompanying drawings forming part of this specification and in which similar reference characters indicate like parts in the several views;—Figure 1 is a side elevation of a feeding mechanism showing a portion of the inlet end of a reducing mill, into which the feeder advances the material to be reduced. Fig. 2 is a top plan view. Fig. 3 is a front elevation. Fig. 4 is an enlarged vertical longitudinal sectional view on the line X—X of Fig. 2. Fig. 5 is a plan view showing the arrangement of the driving devices under the rear end of the feeder. Figs. 6 and 7 illustrate enlarged detailed views of one of the flights.

As this invention relates essentially to a means for feeding alfalfa or other hay, clover, or like forage into a reducing mill, we have shown sufficient of a well known type of mill to make the feeding devices and the purpose of the same readily understood, said reducing mill comprising a suitable casing, A, within which is mounted an appropriate cutter head, B, whose blades or cutters, C, operate over a foraminous or screen bottom, D, arranged concentric with the axis of the rotary cutter and close to the circular path described by the cutting edges of the blades, C, said screen having an inlet opening, E, in its front side to permit the free ingress of the hay or other material advanced thereto by the feeding-mechanism which we will hereinafter specifically describe, said material being advanced into the screen bottom over a stationary cutter bar, F, which coacts with the blades of the rotary cutter to appropriately reduce the material preliminary to its reception into the screen bottom, before mentioned, where the material is further reduced until its particles are fine enough to pass through the meshes of the screen and into a suitable receiver.

The foregoing construction of the reducing mill is well known in this art and forms no essential part of our present invention.

The feeding-mechanism which we prefer to use for delivering the alfalfa or other hay, clover, or other material through the inlet opening of the casing of the reducing mill, comprises suitable corner uprights, 10, of channel-iron or the like, which are joined at their lower portions by longitudinally extending sills, or beams, 11, which are bolted to the uprights and form supports for the feeding table or platform over which the material is advanced. The uprights, 10, are also connected at their top by longitudinally-extending braces or bars, 12, and cross-bars or braces, 13, thus securely tying together the upper portions of the corner uprights and making a rigid structure or framework in which the endless conveyer, which we will hereinafter describe, is mounted to operate.

Extending transversely across the upper rear end of the conveyer frame and having its ends appropriately journaled in boxes, or bearings secured to the uprights, 10, forming the rear portion of said framework, is a horizontal shaft, 14, provided with sprocket wheels, 15—16, said shaft having also secured to one end a sprocket wheel, 17, from which a suitable chain, 18, extends to a similar sprocket wheel, 19, appropriately journaled in the lower portion of the rear uprights, just above the table or platform over which the material is caused to travel. Suitable sprocket wheels, 20 and 21, are also mounted in the upper and lower portions of each of the uprights which constitute the front end of the feeder frame, the uppermost sprocket, 20, at each side of the frame, having its box or bearing adjustably mounted in a vertical opening or guide, 22, formed in the corner upright and connected to a hand-screw, 23, or other appropriate means, whereby the said uppermost sprockets may be vertically adjusted to regulate the tension of the endless conveyer, which is designed to pass around the several sprockets before mentioned, as shown in Figs. 1 and 4.

The conveyer proper consists of endless side chains, 24, of any well known character suitable for the purposes mentioned, and which chains are designed to be driven through the medium of a sprocket chain, 25, or like connection extending between sprocket wheels, 26 and 26'. said sprocket wheel, 26', being fixed to a shaft, 27, journaled beneath the rear end of the feeder and supported upon a framework, 28, which depends from the longitudinal sills of the feeder frame, as shown in Fig. 1, said shaft, 27, carrying a gear wheel, 29, which meshes with a pinion, 30, on a shaft having a gear wheel, 31, meshing with a pinion, 32, on a longitudinal shaft, 33, on which is a pulley, 34, to which power may be applied from any suitable source. This mechanism is located under the rear end of the feeding mechanism and it forms an effective drive therefor, and the preferred specific arrangement of the parts named is indicated in Fig. 5.

The table or platform over which the material is advanced to the reducing devices, includes a floor-plate, 35, which is supported at points between its length by suitable channel-irons, 36, or the like, which extend transversely between longitudinal sills of the frame and are bolted to the latter, as indicated in Fig. 4. At the rear end, the floor-plate is bent downwardly to form an inclined guide, 37, which leads directly into the inlet opening of the reducing mill, as shown in Fig. 4, and over this inclined portion the material is advanced to and beneath an appropriate feed-roll or rollers, 38, which may be of a toothed type, to better engage the alfalfa or hay or other material and feed the same under some pressure directly into the inlet opening of the reducing mill and into the presence of the stationary and movable cutters which reduce the material in the manner well known in this art.

Extending from the inlet end of the reducing mill and along the floor of the platform or table of the feeder for a substantial distance is a housing, 40, which is open at the front end and whose top surface inclines upwardly from the rear to the front to form a front opening of substantial size adapted to receive the alfalfa or other hay, or material which is being conveyed to the reducing mill; the inclined top of the housing forms a wall of a chamber which becomes gradually contracted toward the rear, whereby the loose alfalfa or material delivered into the large mouth or opening of the housing is somewhat compressed during its passage through the housing and on its way over the inclined portion of the floor and beneath the feeding roll, 38.

We also prefer to construct the top of the housing with a series of blades, 41, of spring steel or the like having one end riveted or otherwise secured to the housing, said housing having an opening or openings in its top through which the spring plates pass to the interior chamber and into the path of the alfalfa or material advanced through said chamber, said spring plates forming a series of elastic fingers, beneath which the material passes just about the time it reaches the inclined portion of the table or floor leading to the reducing mill.

Suitably supported on the endless side chains which comprise the endless conveyer, before described, are suitable swinging flights, 42. There may be as many of these flights employed as the circumstances require, and they are arranged at equi-distant points throughout the length of the chains and they each comprise suitable end brackets, 43, which are formed at the upper ends with hubs, 44, adapted to receive bolts, 45, said bolts forming a pivotal support for a link member, 46, which has a hook-shaped portion, 47, adapted to be let into the length of the endless chains and to be hooked into engagement with the links thereof.

The brackets, 43, of each pair are connected at their free ends by a suitable wrought-iron or other pusher, 45', said pusher and brackets constituting a freely swinging flight which is designed to operate over the floor-plate or platform of the table, as indicated in Fig. 4, and to push ahead of it the material deposited on said floor-plate. There may be any desired number of these flights connected to the side chains, and the flights are freely suspended from the chains and depend from the latter, except when passing over the floor-plate. At the front end of the feeder are arranged suitable vertically-disposed bars, or plates, 46', which form a vertical guide for the flights as they move downwardly over the front end of the feeder, and at the lower end the guide is curved toward the floor-plate, or platform of the table, and which curved guide, 47', is for the purpose of causing the flights to change their position as they pass onto the floor-plate or table. In other words, the flights suspended from the upper runs of the chains, depend from the latter as shown in Fig. 4, in which position they pass over the upper sprocket wheels at the front end of the feeder frame and they pass downwardly over the front of the feeder frame in this position until the outer edge of the pusher-bar comes into contact with the curved guide extension, 47', of the floor-plate at the front end of the feeder. Because of the flights being freely pivoted, as the pusher-bar rides over the curved guide, the flight is turned about its pivot and the brackets assume substantially a horizontal position, the pusher, 45', being now substantially edgewise and vertical and with its flat face presented toward the rear of the feeder in which position the pusher is advanced over the floor-plate or platform of the table, pushing ahead of it any material which is engaged during its travel over the floor-plate and forcibly carrying the same into the open end of the housing and beneath the spring fingers for a substantial distance over the downwardly inclined portion of the floor, which leads to the inlet opening of the reducing mill. The construction is such that each pusher is permitted to travel for a substantial distance over the inclined portion of the floor, which insures the material being fed under some pressure beneath the toothed feed roll. The continued motion of the chains lifts the brackets, 43, from their horizontal to an inclined position and finally the brackets are caused to assume a substantially vertical position, with the pushers, 45', substantially horizontal, in which position the flights move upwardly over the rear end of the frame and across the top of the frame, to the front end thereof, where they are received into the guides and still held in substantially the position described until they meet the curved or cam guide, 47', at the lower front end of the frame, where the position of the flights is changed as described.

It will thus be apparent that the flights which are swinging in a vertical position, unless otherwise diverted by the curved guide mentioned, form a positive feeder as the alfalfa or other hay is fed in front of each flight by the operator. As the hay which is fed to the feeder, must go into the cutter as it is mechanically pushed up to the toothed feed-roll, said roll is mounted at a certain distance above the bed-plate, and the bed-plate is dropped away at an angle or incline, as at 37, just in advance of the cutting mechanism. The prime object of this is to release the flight from the hay and enable it to assume its vertical position as quickly as possible and without the possibility of its dragging back with it any of the hay and this is effected in the present instance by allowing the flight to travel over a part of the inclined portion of the floor, and then causing the flight to turn out of its substantially horizontal into its vertical position, before described. It is also apparent that by the use of a solid bottom table such as we describe, the whole material including the fine particles is pushed along the table and into the cutting mechanism.

It will be noted that in most cutters which have a bottom feeder, the fine material is continually falling through and this is usually shoveled back through the cutter; the bags receiving this material will naturally have a higher percentage of the leaves and stems than the other bags and accordingly, there will be a higher protein or feeding value in the bags in which such a large proportion of the fine material is received. In our case all of the material passes over the floor and consequently there is a more uniform admixture of fine and coarse material and a more even percentage of the protein and feeding value in the output of our machine.

Having thus described our invention what we claim as new and desire to secure by Letters Patent is:—

1. In a feeding mechanism, the combination with a table, or floor over which material is to be fed, of an endless conveyer, a supporting framework therefor, flights on the conveyer freely suspended substantially vertically therefrom, and means disposed in the path of travel of the flights for moving them from the vertical into a horizontal position as they approach the receiving end of the table or floor, whereby the flights serve as pushers to advance the material over the table or floor to the delivery end thereof.

2. In a feeding mechanism, the combination with a table or floor over which the material is to be fed, of an endless conveyer having flights freely suspended vertically therefrom, a supporting framework for the conveyer and a flight guide connecting with the receiving end of the floor or table adapted to turn the flights successively about their pivotal points so that they operate in a horizontal position and with a pushing action as they advance over the floor or table toward the delivery end thereof.

3. In a feeding mechanism, the combination with a table or floor over which the material is to be fed, of an endless conveyer having flights freely suspended vertically therefrom, a supporting framework for the conveyer and a flight guide connecting with the receiving end of the floor or table adapted to turn the flights successively about their pivotal points so that they operate with a pushing action as they advance over the floor or table toward the delivery end thereof, and a feed roll at the delivery end of the table beneath which the flights advance the material.

4. In a feeding mechanism, the combination with a table or floor over which the material is to be fed, of an endless conveyer having flights freely suspended vertically therefrom, a supporting framework for the conveyer and a flight guide connecting with the receiving end of the floor or table adapted to turn the flights successively about their pivotal points so that they operate with a pushing action as they advance over the floor or table toward the delivery end thereof, said floor or table having a part at the delivery end inclined downwardly and over a portion of which the flights advance during their forward pushing movement.

5. In a feeding mechanism, the combination with a table or floor over which the material is to be fed, of an endless conveyer having flights freely suspended vertically therefrom, a supporting framework for the conveyer, and a curved guide at the receiving end of the floor or table in the path of downward travel of the flights adapted to turn said flights into substantially a horizontal position, said floor or table forming a support for the flights when the latter are in their horizontal position, and said flights adapted to push before them the material deposited upon said floor or table.

6. In a feeding mechanism, the combination with a table or floor over which the material is to be fed, of an endless conveyer having flights freely suspended vertically therefrom, said flights each composed of a pair of brackets pivotally mounted and a pusher connecting the free ends of said pair of brackets, a supporting framework for the conveyer, and a curved guide at the receiving end of the floor or table in the path of travel of the flights adapted to engage said pusher and turn the flights about their pivotal centers into substantially a horizontal position, said floor or table forming a support for the flights when the latter are in their horizontal position, and said pushers adapted to advance before them the material deposited upon said floor or table.

7. In a feeding mechanism, the combination with a table or floor, over which the material is to be fed, of an endless conveyer having flights freely suspended vertically therefrom, a supporting framework for the conveyer, a vertical guide at the front end of the framework through which the flights successively pass, and a curved guide at the receiving end of the table in the path of travel of the flights adapted to turn the flights successively about their pivotal points so that they operate in a horizontal position and with a pushing action as they advance over the floor or table toward the delivery end thereof.

8. In a feeding mechanism, the combination with a table or floor, over which the material is to be fed, of an endless conveyer having flights freely suspended vertically therefrom, a supporting framework for the conveyer, a vertical guide at the front end of the framework through which the flights successively pass, and a curved guide at the receiving end of the table in the path of travel of the flights adapted to turn the flights successively about their pivotal points so that they operate in a horizontal position and with a pushing action as they advance over the floor or table toward the delivery end thereof, said floor or table having its delivery end inclined downwardly and onto which the pushers are advanced in the concluding part of their forward movement, to facilitate the turning of the flights into their normal vertical position as they leave the floor or table.

9. In a feeding mechanism, the combination with a table, or floor, over which the material is to be fed, of an endless conveyer having flights freely suspended vertically therefrom, a supporting framework for the conveyer, a vertical guide at the front end of the framework through which the flights successively pass, a curved guide at the receiving end of the table in the path of travel of the flights adapted to turn the flights successively about their pivotal points so that they operate in a horizontal position and with a pushing action as they advance over the floor or table toward the delivery end thereof, said floor or table having its delivery end inclined downwardly and onto which the pushers are advanced in the concluding part of their forward movement, to facilitate the turning of the flights into their normal vertical position as they leave the floor or table, and a feed roll mounted above the inclined portion of the table and between which roll and said inclined portion the pushers advance the material.

10. In a feeding mechanism, the combination with a table or floor over which the material is to be fed, of an endless conveyer comprising side chains and pairs of brackets freely suspended therefrom and having their free ends connected by pusher bars, a supporting framework for the conveyer, means for operating the conveyer, a flight guide at the receiving end of the table or floor adapted to turn the flights successively about their pivotal points so that they operate in a horizontal position and with a pushing action as they advance over the floor or table toward the free end thereof, and a housing extending above the table at the delivery end and into which housing the pushers advance the material, said housing having its internal chamber contracting toward the delivery end of the table or floor.

11. In a feeding mechanism, the combination with a table or floor over which the material is to be fed, of an endless conveyer comprising side chains and pairs of brackets freely suspended therefrom and having their free ends connected by pusher bars, a supporting framework for the conveyer, means for operating the conveyer, a flight guide at the receiving end of the table or floor adapted to turn the flights successively about their pivotal points so that they operate in a horizontal position and with a pushing action as they advance over the floor or table toward the free end thereof, and a housing extending above the table at the delivery end and into which housing the pushers advance the material, said housing having its internal chamber contracting toward the delivery end of the table or floor, said housing having spring fingers inclining into the chamber of the housing and beneath which fingers the pushers advance the material.

In testimony whereof we affix our signatures in presence of two witnesses.

ARTHUR P. COOPER.
MILTON C. PETERS.

Witnesses:
G. S. HOFFER,
A. D. BERNDORFF.

Copies of this patent may be obtained for five cents each, by addressing the "Commissioner of Patents, Washington, D. C."